United States Patent [19]

Sacripante et al.

[11] Patent Number: 5,667,568
[45] Date of Patent: Sep. 16, 1997

[54] HOT MELT INK COMPOSITIONS

[75] Inventors: Guerino G. Sacripante, Oakville; Fatima M. Pontes, Mississauga; Stephan V. Drappel, Toronto; Anthony J. Paine, Mississauga; Gregory J. Kovacs, Mississauga, all of Canada

[73] Assignee: Xerox Corporation, Stamford, Conn.

[21] Appl. No.: 624,157

[22] Filed: Mar. 29, 1996

[51] Int. Cl.$^6$ ............................................. C09D 11/02
[52] U.S. Cl. .................. 106/20 R; 106/22 A; 106/23 A; 106/22 H; 106/23 H
[58] Field of Search ............................ 106/20 R, 23 A, 106/22 A, 23 H, 22 H

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 5,006,170 | 4/1991 | Schwarz | 106/20 |
| 5,041,161 | 8/1991 | Cooke et al. | 106/22 |
| 5,121,141 | 6/1992 | Hadimoglu et al. | 346/140 R |
| 5,173,112 | 12/1992 | Matrick et al. | 106/22 H |
| 5,421,868 | 6/1995 | Ayali-Esquilin et al. | 106/22 A |
| 5,560,765 | 10/1996 | Sawada | 106/22 A |

*Primary Examiner*—Helene Klemanski
*Attorney, Agent, or Firm*—E. O. Palazzo

[57] ABSTRACT

An ink composition comprised of a colorant and a bisamide with a viscosity of from about 1 centipoise to about 20 centipoise at a temperature of from about 125° C. to about 185° C., and which bisamide is of the formula

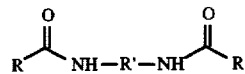

wherein R is an alkyl of from about 2 to about 30 carbon atoms or aryl; R' is an alkylene with from about 2 to about 30 carbon atoms, or R' is a polyalkyleneoxide with from about 2 to about 30 carbon atoms.

27 Claims, 1 Drawing Sheet

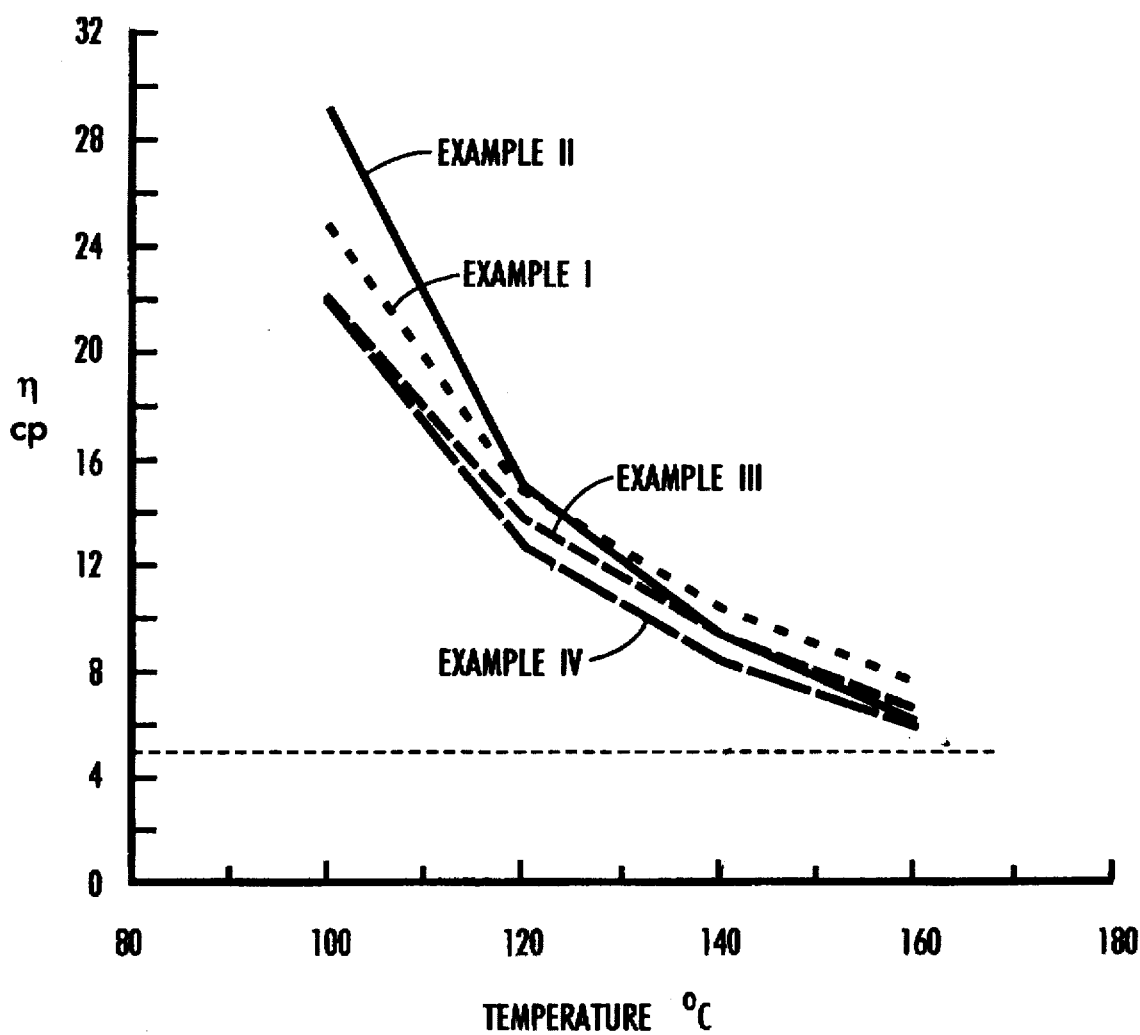

HOT MELT INK COMPOSITIONS

BACKGROUND OF THE INVENTION

The present invention is directed to ink compositions and, more specifically, the present invention relates to hot melt inks especially useful for acoustic ink printing, processes and apparatuses, reference, for example, U.S. Pat. Nos. 5,121,141, 5,111,220, 5,128,726, 5,371,531, U.S. Ser. No. 176,381, U.S. Pat. No. 5,528,384, the disclosures of which are totally incorporated herein by reference, including especially acoustic ink processes as illustrated in some of the aforementioned copending applications and patents, such as an acoustic ink printer for printing images on a record medium.

More specifically, the present invention is directed to hot melt acoustic ink compositions wherein there can be generated with such inks excellent developed images with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water is not present, or very small amounts thereof are selected, in the invention inks, and it is preferred that there be an absence of water, and since water is not present in the inks a dryer can be avoided thereby minimizing the cost of the acoustic ink jet apparatus and process. The inks of the present invention in embodiments thereof are comprised of a colorant and a vehicle, and more specifically, wherein the vehicle is an organo bisamide as illustrated by the following formula

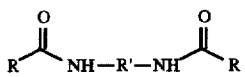

wherein R is an alkyl hydrocarbon of from about 2 to about 50 carbon atoms, and R' is an alkylene or polyalkyleneoxide of from about 2 to about 30 carbon atoms. Examples of R include alkyl and aryl, such as methyl, ethyl, propyl, butyl, hexyl, heptyl, octyl, nonyl, decyl, undecyl, dodecyl, tridecyl, hexadecyl, octadecyl, stearyl, lauryl, phenyl, benzyl, and anthryl. Examples of R' include alkylenes, such as ethylene, propylene, butylene, hexylene, heptylene, octylene, nonylene, decylene, undecylene, dodecylene, tridecylene, hexadecylene, octadecylene, stearylene, laurylene, and the like; poly(ethylene oxide), or poly(propylene oxide) of a molecular weight, $M_w$, of from about 148 to about 700 grams per mole.

In acoustic ink printing, the printhead produces approximately 2.2 picoliter droplets by an acoustic energy process. The ink under these conditions should display a melt viscosity of about 5 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display low melt viscosity, such as from about 1 centipoise to about 20 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties such as a viscosity of 1 to about 10 centipoise at a temperature of from about 125° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink which is melted in the apparatus will not be subject to evaporation or spillage during periods of nonprinting. The vehicle selected possesses a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually need to be heated, for example, to approximately 100° C. before the ink melts and turns into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of a hot melt ink jet is its ability to print on plain paper since the hot melt ink quickly solidifies as it cools and, since it is waxy in nature, does not normally soak into a paper medium. However, hot melt ink jets can be cumbersome in structure and in design, that is, the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. Nos. 5,006,170 and 5,122,187, the disclosures of each of which are totally incorporated herein by reference, disclose hot melt ink compositions suitable for ink jet printing which comprise a colorant, a binder, and a propellant selected from the group consisting of hydrazine, cyclic amines, ureas, carboxylic acids, sulfonic acids, aldehydes, ketones, hydrocarbons, esters, phenols, amides, imides, halocarbons, urethanes, ethers, sulfones, sulfamides, sulfonamides, phosphites, phosphonates, phosphates, alkyl sulfides, alkyl acetates, and sulfur dioxide. Also disclosed are hot melt ink compositions suitable for ink jet printing which comprise a colorant, a propellant, and a binder selected from the group consisting of rosin esters; polyamides, dimer acid amides, fatty acid amides, epoxy resins, fluid paraffin waxes, fluid microcrystalline waxes, Fischer-Tropsch waxes, polyvinyl alcohol resins, polyols, cellulose esters, cellulose ethers, polyvinyl pyridine resins, fatty acids, fatty acid esters, polysulfonamides, benzoate esters, long chain alcohols, phthalate plasticizers, citrate plasticizers, maleate plasticizers, sulfones, polyvinyl pyrrolidinone copolymers, polyvinyl pyrrolidone/polyvinyl acetate copolymers, novalac resins; natural product waxes, mixtures of linear primary alcohols and linear long chain amides, and mixtures of linear primary alcohols and fatty acid amides. In one embodiment, the binder comprises a liquid crystalline material. The inks of the present invention are dissimilar than the aforementioned '179 and '187, in that, for example, the invention vehicle selected displays a viscosity of from about 1 to about 20, and preferably 10 centipoise when heated to a temperature of from about 125° C. to about 165° C., such that acoustic energy in the printhead can eject an ink droplet onto paper. Additionally, the vehicles of the present invention display softening points of from about 50° C. to about 100° C. Furthermore, the bisamide vehicles of the present invention also differ substantially and are not disclosed or suggested, it is believed, from the aforementioned '170 or '187 patents.

U.S. Pat. No. 5,021,802, the disclosure of which is totally incorporated herein by reference, discloses a bubble jet ink which comprises 90 to 99.9 percent by weight of aqueous sol gel medium and 0.1 to 1 percent by weight colorant. The inks are thermally reversible sol gels which are gels at ambient temperatures and form liquid sols at temperatures between about 40° and 100° C.

U.S. Pat. No. 5,041,161, the disclosure of which is totally incorporated herein by reference, discloses an ink jet ink which is semi-solid at room temperature. The ink combines the advantageous properties of thermal phase inks and liquid inks. The inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 30 weight percent of a colorant system.

U.S. Pat. Nos. 4,853,036 and 5,124,718 disclose an ink for ink jet recording which comprises a liquid composition essentially comprising a coloring matter, a volatile solvent having a vapor pressure of 1 millimeter Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167, the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084, the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957, the disclosure of which is totally incorporated herein by reference, discloses water insoluble dyes formulated in a microemulsion-based ink which is waterfast, nonthreading, and bleed-alleviated. The inks comprise (a) about 0.05 to 0.75 weight percent of a high molecular weight colloid, (b) about 0.1 to 40 weight percent of at least two surfactants, comprising at least one surfactant and at least one cosurfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

While the known compositions and processes are suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions which generate high quality, fast-drying images on a wide variety of plain papers at low cost with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided.

Reference is made to copending applications U.S. Ser. No. 624,154, filed concurrently herewith; U.S. Ser. No. 624,156, filed concurrently herewith; and U.S. Ser. No. 624,273, filed concurrently herewith; the disclosures of each application being incorporated herein by reference, illustrate acoustic ink compositions and processes thereof.

BRIEF DESCRIPTION OF THE DRAWINGS

Illustrated in FIG. 1 is a plot of the viscosity of certain inks of the present invention versus the temperature.

SUMMARY OF THE INVENTION

Examples of object of the present invention include, for example:

It is an object of the present invention to provide hot melt ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers.

It is still another object of the present invention to provide hot melt ink compositions which generate high quality images on plain papers.

Another object of the present invention is to provide hot melt ink jet ink compositions which is comprised of a colorant, preferably a dye, and vehicle comprised of an organo bisamide, or an alkylamide terminated polyalkylene oxide, and wherein in embodiments the inks possess a low viscosity of, for example, 5 to 6 at 160° C.

Yet another object of the present invention is to provide hot ink jet ink compositions which exhibit low viscosity of from about 1 to about 10 centipoise at a temperature of from about 125° C. to about 160° C.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot ink jet ink compositions that contain no water and which are suitable for use in acoustic ink jet printing processes.

It is still another object of the present invention to provide hot ink compositions that contain no water and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 centipoise at, for example, the jetting temperature which can be from about 125° C. to about 180° C., and preferably from about 160° C. thereby enabling excellent jetting at reasonable power levels.

Further, in another object of the present invention there are provided hot melt inks with no water and vehicles such as an organo bisamide and a colorant such as a dye.

Additionally, in another object of the present invention there are provided hot melt inks with no water or solvent for ink printing methods and apparatuses, and wherein a number of the advantages as illustrated herein are achievable.

These and other objects of the present invention, or specific embodiments thereof, can be achieved by providing an ink composition which comprises an organo bisamide and a colorant, and optional known ink additives.

DETAILED DESCRIPTION OF THE INVENTION

In embodiments the ink compositions of the present invention comprise a dye or pigment, and an organo bisamide, and wherein the dye is present in various effective amounts, such as from about 2 to about 10 weight percent, and the vehicle is present in an amount of from about 60 to about 90 weight percent.

Embodiments of the present invention include an ink composition comprised of a dye and a bisamide with a viscosity of from about 1 centipoise to about 20 centipoise at a temperature of from about 125° C. to about 185° C., and which bisamide is of the formula

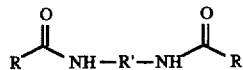

wherein R is a hydrocarbon; R' is a hydrocarbon or a polyalkyleneoxide; an ink composition comprised of a colorant and a bisamide with a viscosity of from about 1 centipoise to about 20, or 5 to about 10 centipoise at a temperature of from about 125° C. to about 160° C., and which bisamide is of the formula

wherein R is an alkyl hydrocarbon, such as stearyl with from about 2 to about 30 carbon atoms or aryl like phenyl; R' is an alkylene with from about 2 to about 30 carbon atoms, or R' is a polyalkyleneoxide with from about 2 to about 30 carbon atoms; wherein the bisamide possesses a molecular weight, Mw, of from about 200 to about 2,000 grams per mole; a printing process which comprises (a) incorporating into an acoustic ink jet printer an ink comprised of a colorant and the bisamide illustrated herein with a viscosity of from about 1 centipoise to about 20 centipoise at a temperature of from about 125° C. to about 185° C.; or a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a colorant and a bisamide with a viscosity of from about 1 centipoise to about 10 centipoise at a temperature of from about 125° C. to about 185° C., or to about 165° C., and which bisamide is as illustrated herein. Examples of alkyl, alkylene, aryl, and polyalkylene oxide are known and include those as illustrated in copending application U.S. Ser. No. 624,154, the disclosure of which is totally incorporated herein by reference, such as methyl, ethyl, propyl, butyl, stearyl, phenyl, ethyleneoxyethyleneoxyethyleneoxymethane, and the like.

Embodiments of the present invention include an ink composition comprised of a colorant in a bisamide of the formulas indicated herein, and wherein R is alkyl with from about 1 to about 25 carbon atoms, R' is alkylene with from about 2 to about 25 carbon atoms, the colorant is a dye present in an amount of from about 0.05 to about 20 weight percent, wherein the colorant is a dye present in an amount of from about 1 to about 10 weight percent, wherein the bisamide is present in an amount of from about 60 to about 99 weight percent, wherein the bisamide is present in an amount of from about 85 to about 97 weight percent, wherein the viscosity of the ink is from about 5 centipoise to about 20 centipoise at a temperature of from about 125° C. to about 185° C., wherein the viscosity of the ink is from about 1 centipoise to about 20 centipoise at a temperature of from about 125° C. to about 185° C., wherein R is alkyl of from about 2 to about 50 carbon atoms; wherein R is methyl, ethyl, propyl, butyl, pentyl, hexyl, and R' is pentylene, wherein the viscosity of the ink is from about 9 centipoise to about 5 centipoise at a temperature of from about 140° C. to about 160° C.; wherein R is methyl, ethyl, propyl, butyl, pentyl, hexyl, heptyl, octyl, nonyl, decyl, undecyl, dodecyl, tridecyl, hexadecyl, octadecyl, benzyl, anthryl; R' is pentylene, nonylene, undecylene, tridecylene, hexadecylene, octadecylene, laurylene, 2-methylpentene, propyleneoxypropyleneoxypropyleneoxypropylene oxypropylene or poly(oxypropylene); R is dodecyl and R' is poly(oxypropylene); wherein viscosity is at a temperature of from about 140° C. to 165° C.; wherein R is aryl; wherein the viscosity is at a temperature of from about 140° C. to about 160° C.; wherein the viscosity is a temperature of from about 140° C. to about 160° C., and wherein this viscosity is from about to about 15 centipoise; wherein the bisamide is present in an amount of from about 0.05 to about 4 percent by weight; wherein the bisamide is present in an amount of from about 0.1 to about 3 percent by weight; and wherein the viscosity of the ink is from about 8 to 12 at a temperature of 140° C., 8 to 10 at 160° C. or 12 to 16 at 125° C.

Examples of organo bisamides of the present invention include N,N'-ethylene bis-acetamide, N,N'-ethylene bis-stearamide, N,N'-propylene bis-stearamide, N,N'-butylene bis-stearamide, N,N'-hexylene bis-stearamide, N,N'-heptylene bis-stearamide, N,N'-octylene bis-stearamide, N,N'-decylene bis-stearamide, N,N'-dodecylene bis-stearamide, N,N'-stearylene bis-stearamide, N,N'-ethylene bis-lauramide, N,N'-propylene bis-lauramide, N,N'-butylene bis-lauramide, N,N'-hexylene bis-lauramide, N,N'-heptylene bis-lauramide, N,N'-octylene bis-lauramide, N,N'-decylene bis-lauramide, N,N'-dodecylene bis-lauramide, N,N'-stearylene bis-lauramide, N,N'-(ethyleneoxyethyleneoxyethylene)-bis-stearamide, N,N'-(ethyleneoxyethyleneoxyethylene-oxyethylene)-bis-stearamide, N,N'-(ethyleneoxyethyleneoxyethyleneoxyethyleneoxyethylene)-bis-stearamide, N,N'-(propyleneoxypropyleneoxypropylene)-bis-stearamide, N,N'-(propyleneoxypropyleneoxypropylene-oxypropylene)-bis-stearamide, N,N'-(propyleneoxypropyleneoxypropyleneoxypropyleneoxyethylene)-bis-stearamide, mixtures thereof, and the like; and which bisamide is present, or selected in various effective amounts of, for example, from about 80 to about 97 percent by weight of the ink.

Examples of colorants, preferably dyes selected for the inks of the present invention, are known, reference the Color Index, and include those as illustrated in U.S. Pat. No. 5,310,887, the disclosure of which is totally incorporated herein by reference, and, for example, Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes such as Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Victoria Blue R, available from Bayer A. G., Leverkusen, Germany, Morfast Blue 100, Morfast Red 104, and Morfast Red 100, available from Morton International Specialty Chemicals Group, Chicago, Ill.; mixtures thereof; and the like with preferred dyes in embodiments including Reactint Black 57AB, Reactint Black X40LV, Reactint Blue 17AB, Reactint Blue X3LV, Reactint Blue X19, Reactint Red X26B-50, Reactint Red X520, Reactint Violet X80LT, Reactint Orange X38, and Reactint Yellow X15, all available from Milliken Chemicals. Typically, the dye is present in the ink in an amount of from about 0.01 to about 10 percent by weight, preferably from about 0.05 to about 4 percent by weight, and more preferably from about 0.1 to about 3 percent by weight, although the amount can be outside these ranges.

Optional ink additives include biocides such as Dowicil 150, 200, and 75, benzoate salts, sorbate salts, and the like, present in effective amounts, such as for example an amount of from about 0.0001 to about 4 percent by weight, and preferably from about 0.01 to about 2.0 percent by weight; pH controlling agents such as acids; or bases, phosphate salts, carboxylates salts, sulfite salts, amine salts, and the like, present in an amount of from 0 to about 1 percent by weight and preferably from about 0.01 to about 1 percent by weight, or the like.

The inks of the present invention are particularly suitable for printing processes wherein the substrate, such as paper, transparency material, or the like, is heated during the printing process to facilitate formation of the liquid crystalline phase within the ink. Preferably, the substrate is heated to the highest temperature possible to enable the most rapid possible ink drying without damaging the substrate. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, frequently being suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention can be prepared by any suitable method. For example, the inks can be prepared by gently stirring or shaking the individual components, such as melt mixing the vehicle comprised of an organo bisamide with a colorant at a temperature of from about 90° C. to about 130° C., followed by cooling to about 25° C.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it execs for a given amount of input power, reference, for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accomodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

One embodiment of the present invention is directed to a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase; and (b) causing droplets of said ink to be ejected onto a recording sheet in an imagewise pattern.

The organo bisamide vehicle utilized in the present invention for generating the ink is prepared by reacting an organic acid or ester with an organic diamine by a condensation process. In one embodiment of this invention, the organo bisamide is prepared, for example, by charging a reactor, such as a 300 milliliter Parr reactor equipped with a distillation apparatus, with from about 2 mole equivalent of an acid, such as stearic acid or benzoic acid, with about 1 mole equivalent of a poly(oxyalkylene) terminated diamine, such as JEFFAMINE D230™ available from Huntsman, and optionally a condensation catalyst, such as dibutylstannoic acid, at a temperature of from about 150° C. to about 185° C. with stirring for a duration of from about 3 to about 6 hours. During this time, water is collected as a byproduct in the distillation receiver. The reaction mixture is then poured into a pan and allowed to cool to room temperature.

The organic acid or ester utilized in the preparation of the organo bisamide can be selected from the group consisting of acetic acid, acetic anhydride, propionic acid, butanoic acid, pentanoic acid, hexanoic acid, heptanoic acid, benzoic acid, octanoic acid, decanoic acid, dodecanoic acid, lauric acid, stearic acid, and esters of the aforementioned acids, such as the methyl, ethyl, propyl, butyl esters and the like, and is utilized in an amount of from about 0.66 mole equivalent of the bisamide.

The organic diamine utilized in the preparation of the organo imide can be selected from the group consisting of 1,2-diaminoethane, 1,2-diaminopropane, 1,4-diaminobutane, 1,5-diaminopentane, 2-methylpentylene diamine, 1,6-diaminohexane, 1,8-diaminooctane, 1,10-diaminodecane, 1,1 2-diaminododecane, poly (oxyalkyleneoxy)-diamine available from Huntsman Corporation as JEFFAMINE 148™, 230™, 400™, 192™, 700™ and 403™, and as illustrated by the formula

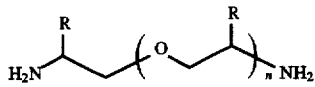

wherein R is H or alkyl like $CH_3$; and n is 2 to 21; and which was utilized in an amount of, for example, about 0.33 mole equivalent of the bisamide.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

N'-dodecyl bis-stearamide was prepared from stearic acid and 1,12-diaminododecane as follows:

A 1 liter Parr reactor equipped with a mechanical stirrer and a distillation apparatus was charged with 568 grams of stearic acid and 200 grams of dodecanediamine. The resulting mixture was then heated to 165° C. over a 2 hour period, followed by increasing the temperature to 185° C. over a 1 hour period. The pressure was then reduced from atmospheric pressure to 40 millimeters Hg, and these conditions were maintained for an additional 2 hours, wherein the total amount of water collected in the distillation receiver was measured to be about 32 milliliters. The pressure was then increased to atmospheric pressure and the product poured into a metal container and left undisturbed to cool down to room temperature. The melt viscosity profile of this ink vehicle is demonstrated in FIG. 1.

EXAMPLE II

N,N'-(ethyleneoxyethyleneoxyethylene)-bis-(stearamide) was prepared from stearic acid and JEFFAMINE 148™ as follows:

A 300 milliliter Parr reactor equipped with a mechanical stirrer and a distillation apparatus was charged with 284 grams of stearic acid and 74 grams of N,N'-(ethyleneoxyethyleneoxyethylene)-diamine available as JEFFAMINE 148™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions maintained for an additional 2 hours, wherein the total amount of water collected in the distillation receiver was measured to be about 17 milliliters. The pressure was then increased to atmospheric pressure and the product poured into a metal container and left undisturbed to cool down to room temperature. The melt viscosity profile of this ink vehicle is demonstrated in FIG. 1, and which viscosity was determined by known means, reference the copending applications recited herein, such as U.S. Ser. No. 624,156, the disclosure of which is totally incorporated herein by reference.

EXAMPLE III

N,N'-poly(propyleneoxy)-bis-(stearamide) was prepared from stearic acid and JEFFAMINE D230™ as follows:

A 300 milliliter Parr reactor equipped with a mechanical stirrer and a distillation apparatus was charged with 284 grams of stearic acid and 115 grams of poly(propyleneoxy)-diamine available as JEFFAMINE D230™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions maintained for an additional 2 hours, wherein the total amount of water collected in the distillation receiver was measured to be about 17 milliliters. The pressure was then increased to atmospheric pressure and the product poured into a metal container and left undisturbed to cool down to room temperature. The melt viscosity profile of this ink vehicle is demonstrated in FIG. 1.

EXAMPLE IV

N,N'-poly(propyleneoxy)-bis-(stearamide) was prepared from stearic acid and JEFFAMINE D400™ as follows:

A 300 milliliter Parr reactor equipped with a mechanical stirrer and a distillation apparatus was charged with 284 grams of stearic acid and 200 grams of poly(propyleneoxy)-diamine available as JEFFAMINE D400™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions maintained for an additional 2 hours, wherein the total amount of water collected in the distillation receiver was measured to be about 17 milliliters. The pressure was then increased to atmospheric pressure and the product poured into a metal container and left undisturbed to cool down to room temperature. The melt viscosity profile of this vehicle is demonstrated in FIG. 1.

Inks were prepared as illustrated in copending application U.S. Ser. No. 624,154, the disclosure of which is totally incorporated herein by reference, and wherein there is utilized as the ink vehicle the present invention bisamide in place of the imide or bisimide of the copending application.

These inks when selected for acoustic jet printers enabled images of excellent resolution, images with superior waterfastness, images with minimal intercolor bleed, excellent image permanence, high image optical densities with relatively low dye concentrations, and wherein curling of the substrate subsequent to printing is minimized.

Other modifications of the present invention may occur to those skilled in the art subsequent to a review of the present application, and these modifications, including equivalents thereof, are intended to be included within the scope of the present invention.

What is claimed is:

1. An ink composition consisting essentially of a colorant and a bisamide with a viscosity of from about 1 centipoise to about 20 centipoise at a temperature of from about 125° C. to about 185° C., and which bisamide is of the formula

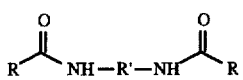

wherein R is alkyl with from 1 to about 25 carbon atoms, and R' is alkylene with from about 2 to about 25 carbon atoms.

2. An ink composition in accordance with claim 1 wherein the bisamide possesses a molecular weight, $M_w$, of from about 200 to about 2,000 grams per mole.

3. An ink composition in accordance with claim 1 wherein the ink is a solid at room temperature, about 20° C. to about 40° C.

4. An ink composition in accordance with claim 1 wherein said bisamide is N,N'-ethylene bis-stearamide, N,N'-propylene bis-stearamide, N,N'-butylene bis-stearamide, N,N'-hexylene bis-stearamide, N,N'-heptylene bis-stearamide, N,N'-octylene bis-stearamide, N,N'-decylene bis-stearamide, N,N'-dodecylene bis-stearamide, N,N'-stearylene bis-stearamide, N,N'-ethylene bis-lauramide, N,N'-propylene bis-lauramide, N,N'-butylene bis-lauramide, N,N'-hexylene bis-lauramide, N,N'-heptylene bis-lauramide, N,N'-octylene bis-lauramide, N,N'-decylene bis-lauramide, N,N'-dodecylene bis-lauramide, N,N'-stearylene bis-lauramide, N,N'-(ethyleneoxyethyleneoxyethylene)-bis-stearamide, N,N'-(ethyleneoxyethyleneoxyethyleneoxyethylene)-bis-stearamide, N,N'-(ethyleneoxyethyleneoxyethyleneoxyethylene-oxyethylene)-bis-stearamide, N,N'-(propyleneoxypropyleneoxypropylene)-bis-stearamide, N,N'-(propyleneoxypropyleneoxypropylene-oxypropylene)-bis-stearamide, or N,N'-(propyleneoxypropyleneoxypropyleneoxypropylene-oxyethylene)-bis-stearamide.

5. An ink composition in accordance with claim 1 wherein said colorant is a dye present in an amount of from about 0.05 to about 20 weight percent.

6. An ink composition in accordance with claim 1 wherein said colorant is a dye present in an amount of from about 1 to about 10 weight percent.

7. An ink composition in accordance with claim 1 wherein said colorant is a dye of cyan, magenta, yellow, blue, green, brown, black dye, or mixtures thereof.

8. An ink composition in accordance with claim 1 wherein said bisamide is present in an amount of from about 60 to about 99 weight percent.

9. An ink composition in accordance with claim 4 wherein said bisamide is present in an amount of from about 85 to about 97 weight percent.

10. An ink composition in accordance with claim 1 wherein said colorant is a dye present in said ink in an amount of from about 0.05 to about 4 percent by weight.

11. An ink composition in accordance with claim 1 wherein R is methyl, ethyl, propyl, butyl, pentyl, hexyl, or stearyl; and R' is ethylene, propylene, butylene, pentylene or heptylene.

12. An ink composition in accordance with claim 1 wherein the bisamide is N,N'-stearylene bis-stearamide, N,N'-(propyleneoxypropyleneoxypropyleneoxypropyleneoxy-ethylene)-bis-stearamide, N,N'-(ethyleneoxyethyleneoxyethylene)-bis-stearamide, or N,N'-dodecylene bis-stearamide.

13. An ink composition in accordance with claim 1 wherein the viscosity is from about 9 centipoise to about 5 centipoise at a temperature of from about 140° C. to about 160° C.

14. An ink composition in accordance with claim 1 wherein R is methyl, ethyl, propyl, butyl, pentyl, hexyl, heptyl, octyl, nonyl, decyl, undecyl, dodecyl, tridecyl, hexadecyl, octadecyl, stearyl, lauryl, phenyl, benzyl, anthryl; R' is ethylene, propylene, butylene, pentylene, hexylene, heptylene, octylene, nonylene, decylene, undecylene, dodecylene, tridecylene, hexadecylene, octadecylene, stearylene, laurylene, 2'-methylpentylene, ethyleneoxyethyleneoxyethylene, ethyleneoxyethyleneoxyethylene, ethyleneoxyethyleneoxyethylene-oxyethylene, ethyleneoxyethylene-oxyethyleneoxyethyleneoxyethylene, propylene-oxypropylene-oxypropylene, propyleneoxypropylene-oxypropyleneoxy propylene, propyleneoxypropyleneoxypropyleneoxypropylene-oxypropylene, or poly(oxypropylene).

15. An ink composition in accordance with claim 1 wherein R is stearyl or dodecyl, and R' is propyleneoxypropylene-oxypropyleneoxy-propylene or poly(oxypropylene).

16. An ink composition in accordance with claim 1 wherein said temperature is from about 140° C. to about 165° C.

17. An ink in accordance with claim 1 wherein said bisamide is present in an amount of from about 0.05 to about 4 percent by weight.

18. An ink in accordance with claim 1 wherein said bisamide is present in an amount of from about 0.1 to about 3 percent by weight.

19. An ink in accordance with claim 1 wherein said viscosity is 8 to 12 at 140° C.; 8 to 10 at 160° C.; or 12 to 16 at 125° C.

20. A printing process which comprises incorporating into an acoustic ink jet printer an ink comprised of a colorant and a bisamide with a viscosity of from about 5 centipoise to about 20 centipoise at a temperature of from about 125° C. to about 185° C., and which bisamide is of the formula

wherein R is an alkyl with from about 2 to about 30 carbon atoms or phenyl; R' is an alkylene with from about 2 to about 30 carbon atoms, or R' is a polyalkyleneoxide with from about 2 to about 30 carbon atoms; and causing droplets of the ink to be ejected in imagewise pattern onto a substrate.

21. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a colorant and a bisamide with a viscosity of from about 1 centipoise to about 20 centipoise at a temperature of from about 125° C. to about 185° C., and which amide is of the formula

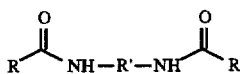

wherein R is an alkyl of from about 2 to about 50 carbon atoms, or a phenyl group; R' is an alkylene or a polyalkyleneoxide, each with from about 2 to about 30 carbon atoms; and (b) causing droplets of said ink to be ejected onto a recording sheet in an imagewise pattern at a temperature of from about 120° C. to about 185° C.

22. A process in accordance with claim 21 wherein said bisamide is N,N'-ethylene bis-stearamide, N,N'-propylene bis-stearamide, N,N'-butylene bis-stearamide, N,N'-hexylene bis-stearamide, N,N'-heptylene bis-stearamide, N,N'-octylene bis-stearamide, N,N'-decylene bis-stearamide, N,N'-dodecylene bis-stearamide, N,N'-stearylene bis-stearamide, N,N'-ethylene bis-lauramide, N,N'-propylene bis-lauramide, N,N'-butylene bis-lauramide, N,N'-hexylene bis-lauramide, N,N'-heptylene bis-lauramide, N,N'-octylene bis-lauramide, N,N'-decylene bis-lauramide, N,N'-dodecylene bis-lauramide, N,N'-stearylene bis-lauramide, N,N'-(ethyleneoxyethyleneoxyethylene)-bis-stearamide, N,N'-(ethyleneoxyethyleneoxyethyleneoxyethylene)-bis-stearamide, N,N'-(ethyleneoxyethyleneoxyethyleneoxyethylene-oxyethylene)-bis-stearamide, N,N'-(propyleneoxypropyleneoxypropylene)-bis-stearamide, N,N'-(propyleneoxypropyleneoxypropylene-oxypropylene)-bis-stearamide, or N,N'-(propyleneoxypropyleneoxy-propyleneoxypropyleneoxyethylene)-bis-stearamide.

23. An ink composition consisting of a colorant and a bisamide with a viscosity of from about 1 centipoise to about 20 centipoise at a temperature of from about 125° C. to about 185° C., and which bisamide is of the formula

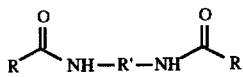

wherein R is an alkyl of from about 2 to about 30 carbon atoms or aryl; R' is an alkylene with from about 2 to about 30 carbon atoms, or R' is a polyalkyleneoxide with from about 2 to about 30 carbon atoms.

24. An ink in accordance with claim 23 wherein R is alkyl with from 3 to about 30 carbon atoms.

25. An ink in accordance with claim 23 wherein R' is polyalkylene oxide with from about 2 to about 30 carbon atoms.

26. An ink composition consisting of a colorant and a bisamide with a viscosity of from about 1 centipoise to about 20 centipoise at a temperature of from about 125° C. to about 185° C., and which bisamide is of the formula

wherein R is an alkyl of from about 2 to about 30 carbon atoms or aryl; R' is a polyalkyleneoxide with from about 2 to about 30 carbon atoms.

27. An ink in accordance with claim 26 wherein alkyl is from 3 to 30 carbon atoms.

* * * * *